UNITED STATES PATENT OFFICE.

HAROLD ROBERT RAFSKY, OF ROXBURY, MASSACHUSETTS.

WHITE PIGMENT.

1,415,391.  Specification of Letters Patent.  Patented May 9, 1922.

No Drawing. Application filed March 29, 1916, Serial No. 87,624. Renewed June 2, 1921. Serial No. 474,529.

*To all whom it may concern:*

Be it known that I, HAROLD R. RAFSKY, a citizen of the United States, residing at Roxbury, in the county of Suffolk and State of Massachusetts, have invented certain new and useful Improvements in White Pigments, of which the following is a specification.

My invention relates to a new and useful white pigment.

My pigment is a substitute for coating materials producing a glossy surface and is intended to replace them wholly or in part in coated paper. The surface of the paper coated with my pigment possesses approximately the same gloss as that coated with clay. Paper coated with my pigment and which is intended for printing is suitable for the production of fine printing results. It possesses a lesser gloss than that coated with satin white and can therefore be viewed with less strain upon the eyes. My pigment is relatively inexpensive to produce and will find extensive use because of this fact.

In the production of my pigment or coating for the application to the surface of paper "body stock," I take a suitable dolomitic lime or other suitable lime containing magnesia (MgO), and slake the same with water. I do not restrict myself to a lime of definite magnesia (MgO) content because I have found limes of various magnesia (MgO) contents suitable for my purpose.

Then, after the slaking has been completed, I add sodium carbonate ($Na_2CO_3$), either in solution or other convenient form. The mixture is then agitated and boiled for a sufficient length of time whereupon there is produced an essentially insoluble material and a solution of sodium hydroxide (NaOH), containing more or less sodium carbonate ($Na_2CO_3$) according to the original proportions in which the reacting substances were added. The exact composition of the insoluble material is not as yet known, but analyses indicate that it consists chiefly of calcium carbonate ($CaCO_3$) and magnesium hydroxide ($Mg(OH)_2$). From the analytical data, it is probable that some other compound or compounds of the alkaline earth metal or metals in question is or are present in small amounts, but the exact nature of such compound or compounds has not been determined.

It is understood that other impurities may be present, depending on the purity of the raw materials employed.

Of course it is understood that by using limes of varying magnesia contents, the quantitative composition of the material produced will be changed, but the material still retains the same general qualitative character.

This material produced as indicated above is of extremely fine grain and consequently settles very poorly. It is therefore filter-pressed, washed and sieved, or these operations may be interchanged or divided into stages as desired. The material may now be used directly as a pigment for coating paper, or it may be dried first as desired.

With the addition of a suitable adhesive, or mixture of adhesives, the pigment may be used directly for coating paper "body stock" employing the machines generally used for this purpose; or there may be admixed with the pigment and adhesive mixture other organic materials, adhesive or otherwise, or inorganic materials, or a combination of both classes of substances, such as may be used in the manufacture of "coated" paper and the entire mixture used to coat paper "body stock," employing the machines generally used for the production of "art" or "coated" paper. The "coated" paper produced may be calendered or otherwise finished as desired.

Of course it is understood that with change in the severity of the calendering corresponding changes will be apparent in the degree of gloss imparted to the surface of the paper, but in general it may be stated that these changes correspond approximately to the changes taking place under similar conditions with a clay coated paper.

The words "coated paper" in this application are to be understood as referring to all types of paper of all weights, such as are coated commercially.

It is to be understood that the form of my invention herewith shown and described is to be taken as a preferred example thereof, and that various changes may be resorted to in the practice of my invention without departing from the spirit of the invention or the scope of the subjoined claim.

Having thus described my invention, I claim:

A composition of matter of very fine grain, the same consisting of the insoluble product resulting from the interaction of slaked lime containing magnesia and sodium carbonate in an aqueous medium.

In testimony whereof I affix my signature in presence of two witnesses.

HAROLD ROBERT RAFSKY.

Witnesses:
CHARLES J. BURKHARDT,
SARAH RAFSKY.